US011032486B2

(12) United States Patent
Sun et al.

(10) Patent No.: US 11,032,486 B2
(45) Date of Patent: Jun. 8, 2021

(54) REDUCING A FLICKER EFFECT OF MULTIPLE LIGHT SOURCES IN AN IMAGE

(71) Applicant: Google LLC, Mountain View, CA (US)

(72) Inventors: Gang Sun, San Jose, CA (US); Jinglun Gao, San Mateo, CA (US); Ruben Manuel Velarde, Chula Vista, CA (US); Szepo Robert Hung, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/902,623

(22) Filed: Jun. 16, 2020

(65) Prior Publication Data

US 2021/0112189 A1 Apr. 15, 2021

Related U.S. Application Data

(60) Provisional application No. 62/914,057, filed on Oct. 11, 2019.

(51) Int. Cl.
*H04N 5/235* (2006.01)

(52) U.S. Cl.
CPC ......... *H04N 5/2357* (2013.01); *H04N 5/2351* (2013.01); *H04N 5/2353* (2013.01)

(58) Field of Classification Search
CPC ... H04N 5/2351; H04N 5/2353; H04N 5/2357
See application file for complete search history.

(56) References Cited

U.S. PATENT DOCUMENTS

| 5,239,369 | A | * | 8/1993 | Suzuki | H04N 5/235 348/226.1 |
|---|---|---|---|---|---|
| 8,068,148 | B2 | | 11/2011 | Noyes | |
| 8,134,637 | B2 | | 3/2012 | Rossbach et al. | |
| 8,934,666 | B2 | | 1/2015 | Luke et al. | |
| 9,044,171 | B2 | | 6/2015 | Venkatraman et al. | |
| 9,098,908 | B2 | | 8/2015 | Kirk | |

(Continued)

FOREIGN PATENT DOCUMENTS

JP H02252371 10/1990

OTHER PUBLICATIONS

Benke, "Improving Smartphone Cameras with Color Sensor Technology", OpenSystems Media, Nov. 10, 2016, 5 pages.

(Continued)

*Primary Examiner* — Jason A Flohre
(74) *Attorney, Agent, or Firm* — Colby Nipper

(57) ABSTRACT

Techniques and apparatuses are described for reducing a flicker effect of multiple light sources in an image captured with an imaging device. A lighting frequency associated with each of the multiple light sources is detected and prioritized relative to a flicker effect upon the image to identify at least a first-prioritized lighting frequency and a second-prioritized lighting frequency. A first exposure-time factorization set is determined for the first-prioritized lighting frequency, and a second exposure-time factorization set is determined for the second-prioritized lighting frequency. An exposure time of the imaging device is adjusted to an exposure time identified in the first exposure-time factorization set that matches, or aligns near-to-matching, an exposure time identified in the second exposure-time factorization set.

20 Claims, 4 Drawing Sheets

(56) References Cited

U.S. PATENT DOCUMENTS

| | | | |
|---|---|---|---|
| 9,253,412 B2 | 2/2016 | Lee | |
| 9,288,374 B1 | 3/2016 | Cooper et al. | |
| 9,596,443 B2 | 3/2017 | Fung et al. | |
| 9,686,475 B2 | 6/2017 | Neglur | |
| 2005/0212956 A1 | 9/2005 | Liao et al. | |
| 2010/0238343 A1* | 9/2010 | Kawarada | H04N 5/3745 348/345 |
| 2013/0258171 A1 | 10/2013 | Kikuchi et al. | |
| 2013/0342726 A1* | 12/2013 | Ebina | H04N 5/2352 348/226.1 |
| 2014/0009639 A1 | 1/2014 | Lee | |
| 2015/0156388 A1 | 6/2015 | Neglur | |
| 2015/0207975 A1* | 7/2015 | Nguyen | H04N 5/2357 348/228.1 |
| 2017/0280042 A1* | 9/2017 | Tadano | H04N 5/374 |
| 2018/0213141 A1 | 7/2018 | Pandit et al. | |
| 2018/0309919 A1 | 10/2018 | Naing et al. | |

OTHER PUBLICATIONS

Gao, et al., "Utilizing Spectral Sensor Data and Location Data to Determine the Lighting Conditions of a Scene", Technical Disclosure Commons; Retrieved from https://www.tdcommons.org/dpubs_series/2734, Dec. 4, 2019, 8 pages.

He, et al., "Logical Camera Module for a Heterogeneous Camera System", Technical Disclosure Commons; Retrieved from https://www.tdcommons.org/dpubs_series/2577, Oct. 17, 2019, 9 pages.

Ye, et al., "Camera Capture and Frame-Rate Synchronization in a Multi-Camera System", Technical Disclosure Commons; Retrieved from https://www.tdcommons.org/dpubs_series/2578, Oct. 17, 2019, 7 pages.

"International Search Report and Written Opinion", PCT Application No. PCT/US2020/047236, dated Nov. 19, 2020, 16 pages.

Gao, et al., "Camera Sensor Exposure Control During Camera Launch", Nov. 24, 2020, 7 pages.

Gao, et al., "Scene Metering and Exposure Control for Enhancing High Dynamic Range Imaging", Technical Disclosure Commons; Retrieved from https://www.tdcommons.org/dpubs_series/3092, Apr. 1, 2020, 12 pages.

* cited by examiner

REDUCING A FLICKER EFFECT OF MULTIPLE LIGHT SOURCES IN AN IMAGE

PRIORITY APPLICATION

This application claims priority under 35 U.S.C. § 119(e) to U.S. Provisional Patent Application No. 62/914,057, filed Oct. 11, 2019, the disclosure of which is incorporated in its entirety by reference herein.

BACKGROUND

Complementary metal oxide semiconductor (CMOS) sensors are commonly used by digital cameras and digital video cameras to create images. Typically, the image-capture process uses a rolling-shutter method in which a still image, or frame of a video, is captured by exposing, sampling, and reading out pixels sequentially in a scan line, rather than all at once. Additionally, each scan line of the image is sampled at a slightly different time with a uniform exposure time.

Certain light sources that are powered by an electrical alternating current (AC) flicker at the given AC frequency. This light flicker, in combination with the CMOS sensor rolling shutter and an exposure time that differs from the light flicker, causes the resulting image or video captured by the CMOS sensor to have a noticeable banding or flicker effect in the recorded image, typically in the form of darker or shadowed zebra-like lines across the image, or darker moving lines across a video recording.

SUMMARY

This document describes an example imaging device, system, and method for reducing, in a captured image, lighting flicker effects from multiple artificial light sources containing different lighting (e.g., blinking) frequencies. In areas where artificial light is used, for instance in homes, shopping malls, offices, restaurants, and the like, it is common to have multiple light sources with different lighting frequencies. For example, many traditional incandescent or fluorescent lamps are aligned with a power source frequency (e.g., 50/60 Hz sine wave, and 100/120 Hz in energy domain, or 100 Hz in Europe, etc.), and most of the Light Emitting Diode (LED) light sources have much higher frequencies. By detecting the lighting frequencies of these multiple light sources, the more-harmful ones with respect to image quality are identified, and steps are taken to control the imaging device CMOS sensor exposure time. This reduces or cancels a banding effect, flicker effect, or flicker artifact (collectively referred to as "flicker effect") in a captured image, which typically displays as darker or shadowed zebra-like lines across the image or darker moving lines across a video recording.

An example method of reducing a flicker effect of multiple light sources in an image captured with an imaging device includes first detecting a lighting frequency associated with each of the multiple light sources. The lighting frequencies of the light sources are then prioritized, relative to the flicker effect upon the image, to identify at least a first-prioritized lighting frequency and a second-prioritized lighting frequency. A first exposure-time factorization set for the first-prioritized lighting frequency is determined, and a second exposure-time factorization set for the second-prioritized lighting frequency is likewise determined. An exposure time of the imaging device is then adjusted to an exposure time in the first exposure-time factorization set that is a match to, or is a near match to (e.g., if no exact match exists), an exposure time in the second exposure-time factorization set.

BRIEF DESCRIPTION OF THE DRAWINGS

Examples of a system and method for addressing flicker effects from multiple light sources in an image captured in an imaging device will now be described with reference to the accompanying drawings. Throughout the drawings, identical reference numbers designate similar, but not necessarily identical, elements.

DETAILED DESCRIPTION

Figure 1:
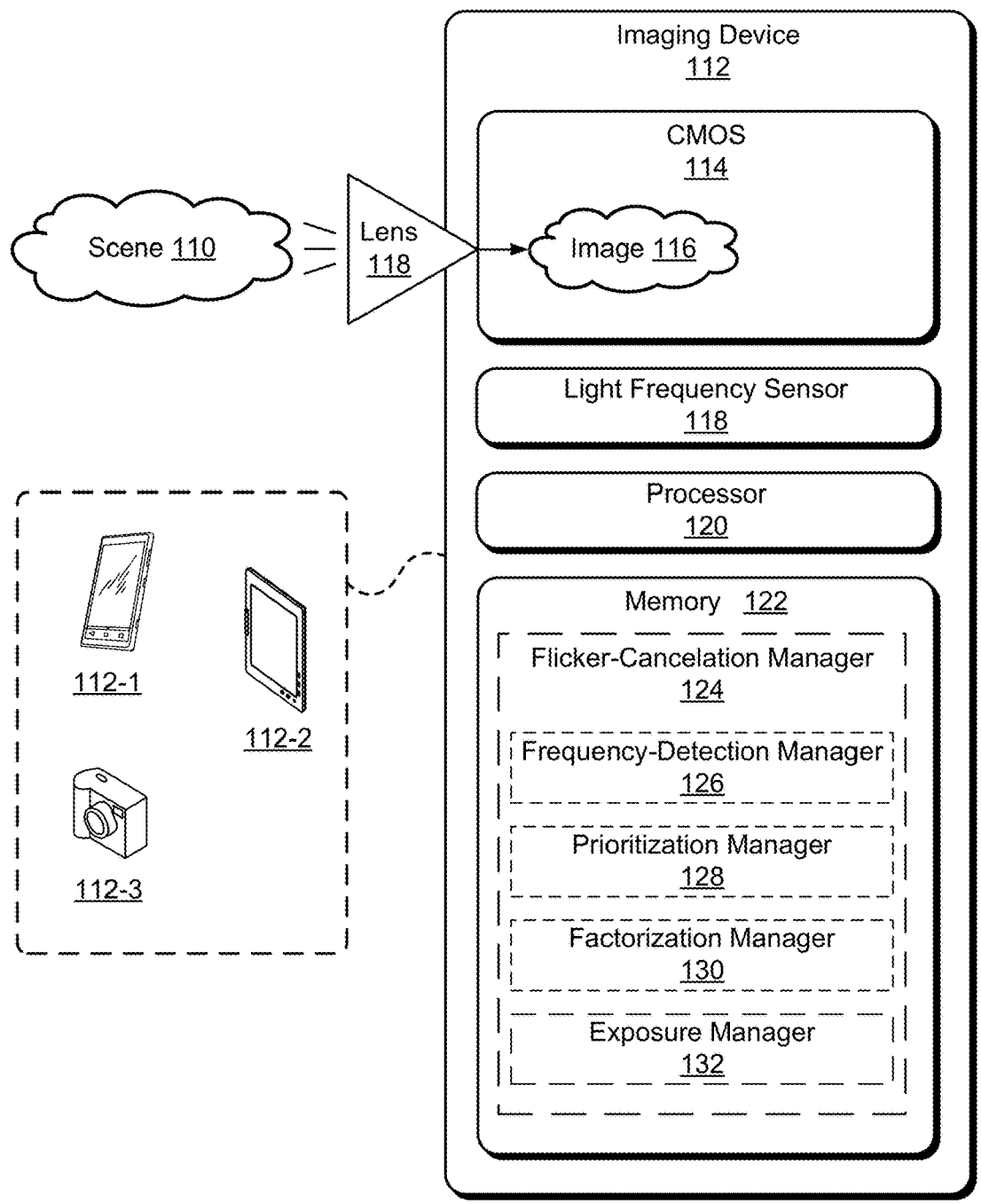
FIG. 1 illustrates an example imaging device configured to reduce lighting flicker effects from multiple light sources in a captured image.

FIG. 1 is a block diagram illustrating an example imaging device configured to reduce or cancel lighting flicker effects from multiple light sources in a captured image. Light sources 1-N, at 102, 104, 106, and 108, may exist in a typical artificially lighted environment, for example a home, business, or other structure, in which a person may be interested in taking a photograph (e.g., capturing an image) of a person, object, or scene 110. Each light source 102-108 may flicker at a different lighting frequency. The person may be using any type of device that incorporates a digital camera or digital video camera as represented by the imaging device 112. As some non-limiting examples, the imaging device 112 may be a mobile phone 112-1, a tablet device 112-2, or a digital video camera or digital camera 112-3. The imaging device 112 is enabled with hardware, software, and functionality for reducing flicker effects from the multiple light sources 102-108 in a captured image.

The imaging device 112 may include a standard CMOS chip 114 using rolling-shutter technology for capturing an image 116 of the scene 110 through a camera lens 118. The imaging device 112 may also include a dedicated hardware light frequency sensor 118, a processor 120, and a memory 122. Imaging device 112 may also include other hardware components, for example, an application-specific integrated circuit (ASIC). The memory 122 is a machine-readable medium (e.g., computer/processor-readable medium) configured for storing data and/or programming instructions executable by a processor or processors. For example, the memory 122 may be a random-access memory (RAM), read-only memory (ROM), flash memory, cache memory, or solid-state drive (SSD). The memory 122 includes data and/or programming instructions executable by the processor 120 for reducing or canceling a flicker effect from the multiple light sources 102-108 in a captured image 116. Reducing or canceling the flicker effect reduces potential darker or shadowed zebra-like lines across the image 116 or darker moving lines across a video recording of the scene.

The memory 122 includes a flicker-cancelation manager 124 configured to reduce or cancel a flicker effect from the multiple light sources 102-108 in a captured image 116. In this example, the flicker-cancelation manager 124 is depicted as an application defined by executable instructions, for example, firmware or software, in the memory 122 for execution on the processor 120. However, the operations of the flicker-cancelation manager 124 may be implemented in whole or in part using an application-specific integrated circuit (ASIC) and/or other hardware components either alone or in combination with programming instructions executable by the processor 120. Example data in the flicker-cancelation manager 124 may include exposure limits, frame rate limits, and sensor hardware limits associated with the imaging device 112 as set by design specifications defined with the product description for the imaging device.

The flicker-cancelation manager 124 may include a frequency-detection manager 126, a prioritization manager 128, a factorization manager 130, and an exposure manager 132. These manager-modules are shown separately in the illustration for discussion purposes, but they may be combined or further separated into additional modules, according to design and functional preference. The frequency-detection manager 126 functions to detect the lighting frequency of each of the multiple light sources 102-108 that may affect the image quality of the image 116 captured by the CMOS 114. The frequency-detection manager 126 may coordinate with the dedicated hardware light frequency sensor 118 to detect light source frequencies with high confidence.

The prioritization manager 128 prioritizes the lighting frequencies of the multiple light sources 102-108 relative to a flicker effect upon an image quality of the image 116. From these prioritized lighting frequencies, at least a first-prioritized lighting frequency and a second-prioritized lighting frequency are identified. A specific light source 102-108 lighting frequency is identified as a higher-prioritized lighting frequency if it produces a worse or more-noticeable lighting flicker effect upon the resulting image quality of the image 116 relative to the other lighting frequencies. In other words, lighting frequencies of light sources that will most likely cause darker, zebra-like banding lines on the image 116 are higher-prioritized as the primary lighting frequencies to address and reduce their effect in the image. In this context, a first-prioritized lighting frequency is identified as potentially producing a worse lighting flicker effect upon the image 116 than a second-prioritized lighting frequency. Similarly, the second-prioritized lighting frequency is identified as potentially producing a worse lighting flicker effect upon the image 116 than a third-prioritized lighting frequency, and so forth.

Factorization manager 130 calculates a first exposure-time factorization set for the first-prioritized lighting frequency, a second exposure-time factorization set for the second-prioritized lighting frequency, and may calculate a third exposure-time factorization set for a third-prioritized lighting frequency, and so forth. An exposure-time factorization set is calculated by first aligning the exposure time of the CMOS 116 with the lighting frequency (e.g., $f_x$) of the light source being addressed. Then, a set of exposure times for that lighting frequency $f_x$ are defined to be multiples of the function: $1/f_x$. This set of exposure times defines the exposure-time factorization set for that lighting frequency and is created within the bounds of the exposure limits of the imaging device. The exposure-time factorization set identifies multiples of the exposure time to be considered for reducing or canceling a flicker effect in the captured image 116 for that light source being addressed.

Exposure manager 132 adjusts an exposure time of the imaging device to a first exposure time in the first exposure-time factorization set that matches or aligns near-to-matching a second exposure time in the second exposure-time factorization set. If the second exposure time in the second exposure-time factorization set matches the first exposure time in the first exposure-time factorization set, then that matching second exposure time is selected. If there is no exact match exposure time between the two sets, then the exposure time of the imaging device is adjusted to an exposure time in the first exposure-time factorization set that aligns near-to-matching an exposure time in the second exposure-time factorization set. This results in reducing, and potentially canceling, the lighting flicker effect of at least the two highest-prioritized lighting frequencies in the image 116. The entire process, coordinated by flicker-cancelation manager 124, may be repeated for each light source 102-108 and their respective frequencies, to ensure a flicker effect is reduced in the resulting image 116 relative to the multiple light sources 102-108.

Figure 2:
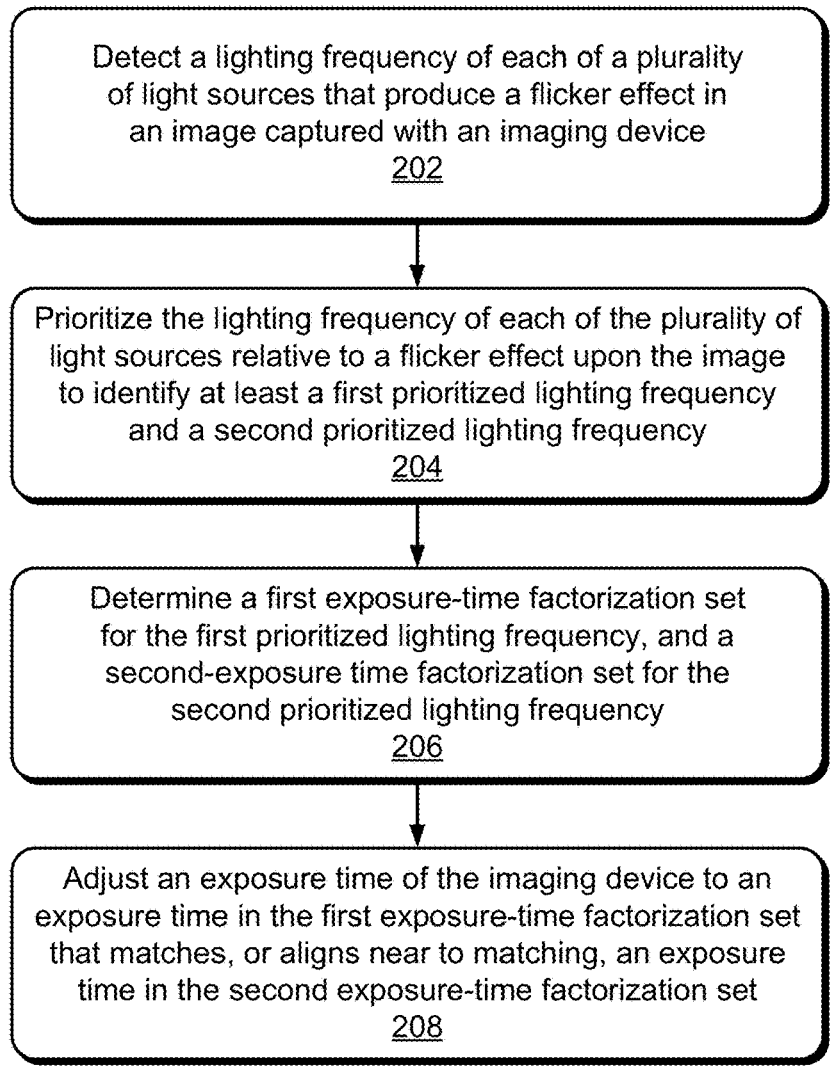
FIG. 2 is a flow chart illustrating an example method for reducing lighting flicker effects from multiple light sources in an image captured by an imaging device.

FIG. 2 is a flow diagram illustrating an example method 200 for reducing or canceling lighting flicker effects from a plurality of light sources in an image captured with an imaging device. At 202, a lighting frequency associated with each of the plurality of light sources, and that may affect the image captured, is detected. An example method for detecting the lighting frequencies uses the image frame captured to compute the lighting frequency by counting the occurrence of the brightness change pattern in the known exposure time. This method works in simple scenes. However, since the lighting brightness change may be presented in pulse waves or sine waves, the brightness change may not always be easily identified. Additionally, due to the exposure time and rolling-shutter scanning speed, the resolution of the lighting frequency, as well as the frequency range, may be limited. Furthermore, the content of the frame can be misleading of the brightness change when it is not uniform, thus making it more difficult to detect even when the zebra-like pattern is present in certain regions. Accordingly, additional methods may be used for detecting the lighting frequencies, either alone or in combination with counting the occurrence of the brightness change pattern in the known exposure time.

Another example method of detecting lighting frequencies is to use a dedicated hardware light frequency sensor, other than the standard imaging sensor of the imaging device, which may expose extremely-high frequencies of light sources (e.g., due to the Nyquist-Shannon sampling theorem). In this context, when the data acquisition for the image occurs over a reasonable time period, the sensor can detect a very broad lighting frequency with high resolution. Moreover, fast Fourier processing may also be leveraged to compute the lighting frequency and magnitude, or additional computing may be applied, for example, by using a temporal filter.

At 204, the lighting frequency of each of the plurality of light sources is prioritized, relative to a flicker effect upon the image, to identify at least a first-prioritized lighting frequency and a second-prioritized lighting frequency. A lighting frequency that has an increased flicker effect upon the image (e.g., darker zebra-like banding lines on the image) is assigned a higher priority relative to other lighting frequencies. Prioritization is necessary because each light source may convey its own lighting frequency, and in order to reduce flicker as much as possible from all the frequencies, an exposure time must be long enough to cover the greatest common divisor. However, this exposure time could be too long and thereby cause an over-exposed image. Thus, the lighting frequencies are prioritized to identify those that most affect the image quality. Those higher prioritized frequencies are then addressed first to improve image quality over other lighting frequency effects.

An example metric and method for prioritizing lighting frequencies that could affect the image quality introduced by certain light sources is set forth in the following function statement (A):

$$h = c_1 * M(f) + c_2 * F(f) + c_3 * R(f) \quad (A)$$

Where h is the resulting relative prioritization value, $c_i$ is the weight of each metric function described herein, and f is the detected frequency. These three metric terms represent the effect on image quality.

A first metric term of the function statement (A) is defined in the following statement (A1):

$$M(f) \quad (A1)$$

This indicates the measurement of the strength (e.g., magnitude) of the lighting frequency signal. The stronger the signal is, the more the effect on the image quality it could introduce.

Although M(f) may be used as a single metric, in practice, when given a certain exposure time, the higher the energy cycle of the light source the less visible the flicker or banding effect there may be.

Therefore, a second metric term of the function statement (A) is introduced, which is the power-cycle function of the lighting frequency p(f), represented in a normalized way in the following statement (A2):

$$P(f) = 1/f \quad (A2)$$

This means the higher the frequency, the less likely it can affect the image quality since more power cycles can be contained in a captured frame.

Another factor that a flicker effect may preserve in video capture or preview is the rolling effect (the darker banding lines moving across a video recording). This is because when the flicker frequency is not aligned with the exposure time as well as the frame rate, the banding will shift across the frame, which makes the preview or video capture even worse in terms of image quality. Moreover, such a shift can be considered as motion in image-based motion metering, which could lead to more exposure change (e.g., more likely shorter exposure time to reduce motion blur), further impacting image quality.

Given this observation, a third metric term of the function statement (A) reflects a rolling effect RO as represented in the following statement (A3):

$$R(f) = \min(f \% FR, (f+FR) \% FR) \quad (A3)$$

In this function, FR means the frame rate of capture, and modulation (%) checks if the frequency is aligned with the frame rate, or not, and how big the shift is. A slower shift may be seen in a small difference, while a faster shift can be found when the deviation is large.

Finally, these three metric terms (A1), (A2), and (A3) are combined into the overall metric represented in function statement (A). This function statement (A) is used to measure and prioritize the effect of each lighting frequency of each of the plurality of light sources upon the image captured with the imaging device.

At 206, a first exposure-time factorization set is determined for the first-prioritized lighting frequency, and a second exposure-time factorization set is determined for the second-prioritized lighting frequency. An exposure-time factorization set is calculated by first aligning the exposure time of the imaging device with the lighting frequency of the light source being addressed. Then, a set of exposure times for that lighting frequency is defined to include multiples of the function: 1/lighting frequency. This exposure-time factorization set identifies multiples of the exposure time to be considered for reducing a flicker effect in the captured image for that light source being addressed.

At 208, an exposure time of the imaging device is now adjusted to an exposure time in the first exposure-time factorization set that matches or aligns near-to-matching an exposure time in the second exposure-time factorization set. This results in reducing or canceling the lighting flicker effect of the at least two highest prioritized lighting frequencies in the resulting image. This process of prioritizing the lighting frequencies at 204, determining exposure-time factorization sets at 206, and adjusting an exposure time of the imaging device at 208, may be performed for additional light sources of the plurality of light sources detected, to improve image quality with reduced flicker relative to the plurality of light sources.

Figure 3:
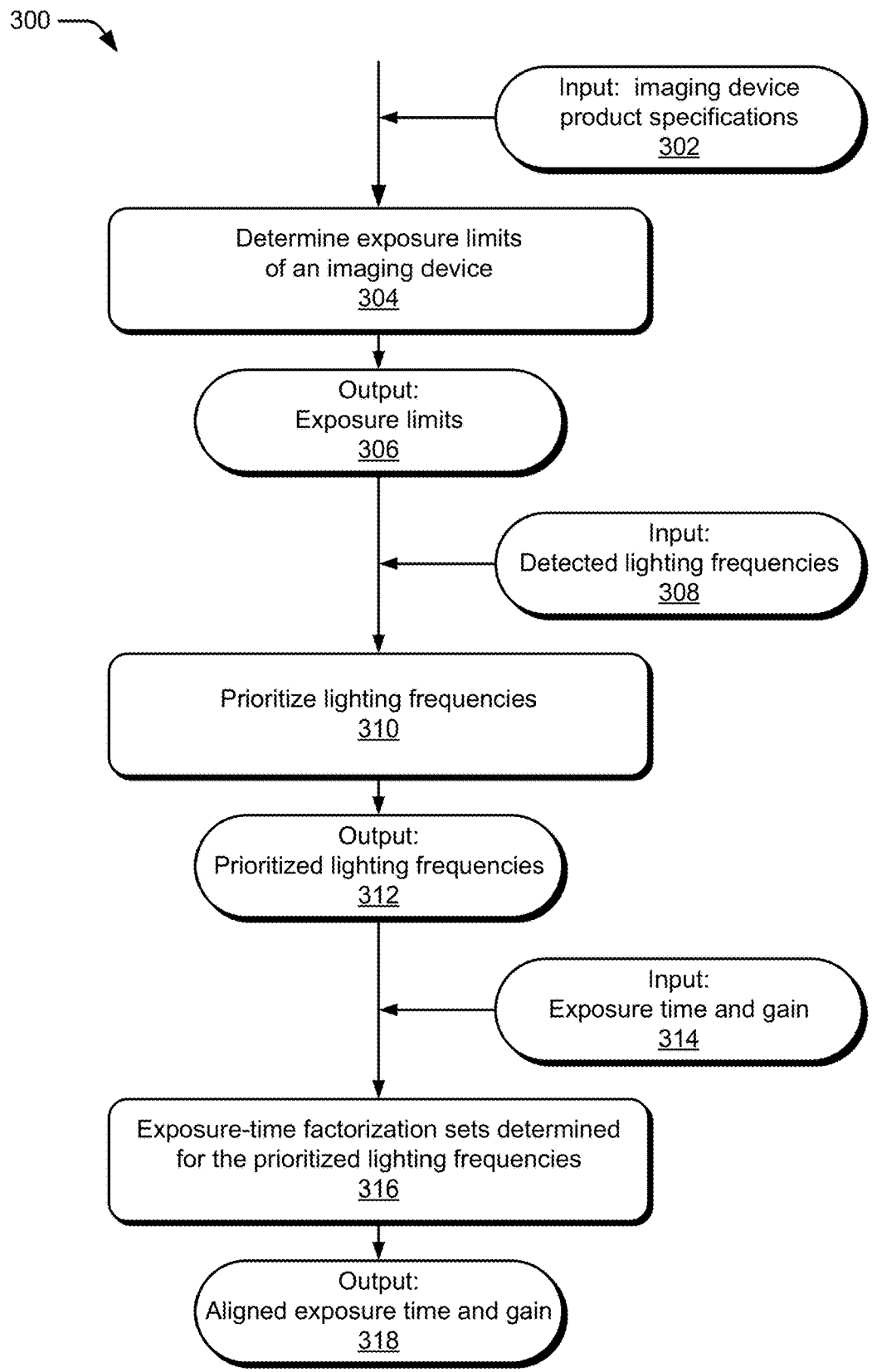
FIG. 3 is a flow chart illustrating operations, data, inputs, and outputs of an example method for reducing lighting flicker effects from multiple light sources in an image captured by an imaging device.

FIG. 3 is a flow chart 300 illustrating high-level operations, data, inputs, and outputs of an example method for reducing flicker effects from a plurality of light sources in an image captured by an imaging device. At 302, data identifying product specification information associated with the imaging device regarding image capture functionality, limits, and capabilities, are received as input data. For example, data defining frame-rate limits and sensor hardware limits are received. This data is helpful in order to work within the limits of the imaging device for reducing a flicker effect on an image captured by the imaging device. At 304, exposure limits of the imaging device are identified from the product specification input data. Exposure limits associated with the imaging device are typically set by the design specifications associated with the product description for the imaging device. These limits are preferably stored as parameter data in the imaging device, although they may be obtained through other linking or networking functionalities. These limits are used to define the bounds associated with exposure time of the imaging device so that exposure-time factorization sets (discussed and calculated separately herein) are also bound by the limits of the imaging device. At 306, the identified exposure limits are output for subsequent reference in determining exposure-time factorization sets for reducing a flicker effect in the image.

At 308, input data is obtained that identifies detected lighting frequencies of a plurality of lighting sources that may impact the quality of the image to be captured by the imaging device. At 310, the detected lighting frequencies are prioritized relative to a flicker effect upon the image to be captured by the imaging device. At least a first-prioritized lighting frequency and a second-prioritized lighting frequency are identified and output at 312 for subsequent use in reducing a flicker effect in the image.

At 314, the current exposure time and gain associated with the imaging device for capturing the image are obtained. At 316, exposure-time factorization sets are determined for the prioritized lighting frequencies previously identified. At least a first exposure-time factorization set is determined for the first-prioritized lighting frequency, and a second exposure-time factorization set is determined for the second-prioritized lighting frequency. The exposure-time factorization sets are determined relative to the current exposure time and gain, the prioritized lighting frequencies, and the exposure limits previously determined.

At 318, the current exposure time of the imaging device is aligned to an exposure time in the first exposure-time factorization set that matches or aligns near-to-matching an exposure time in the second exposure-time factorization set. The exposure time of the imaging device is now adjusted to capture the image with a reduced flicker effect relative to at least the first-prioritized lighting frequency and the second-prioritized lighting frequency, and for other frequencies calculated and prioritized, of the plurality of light sources.

Figure 4:
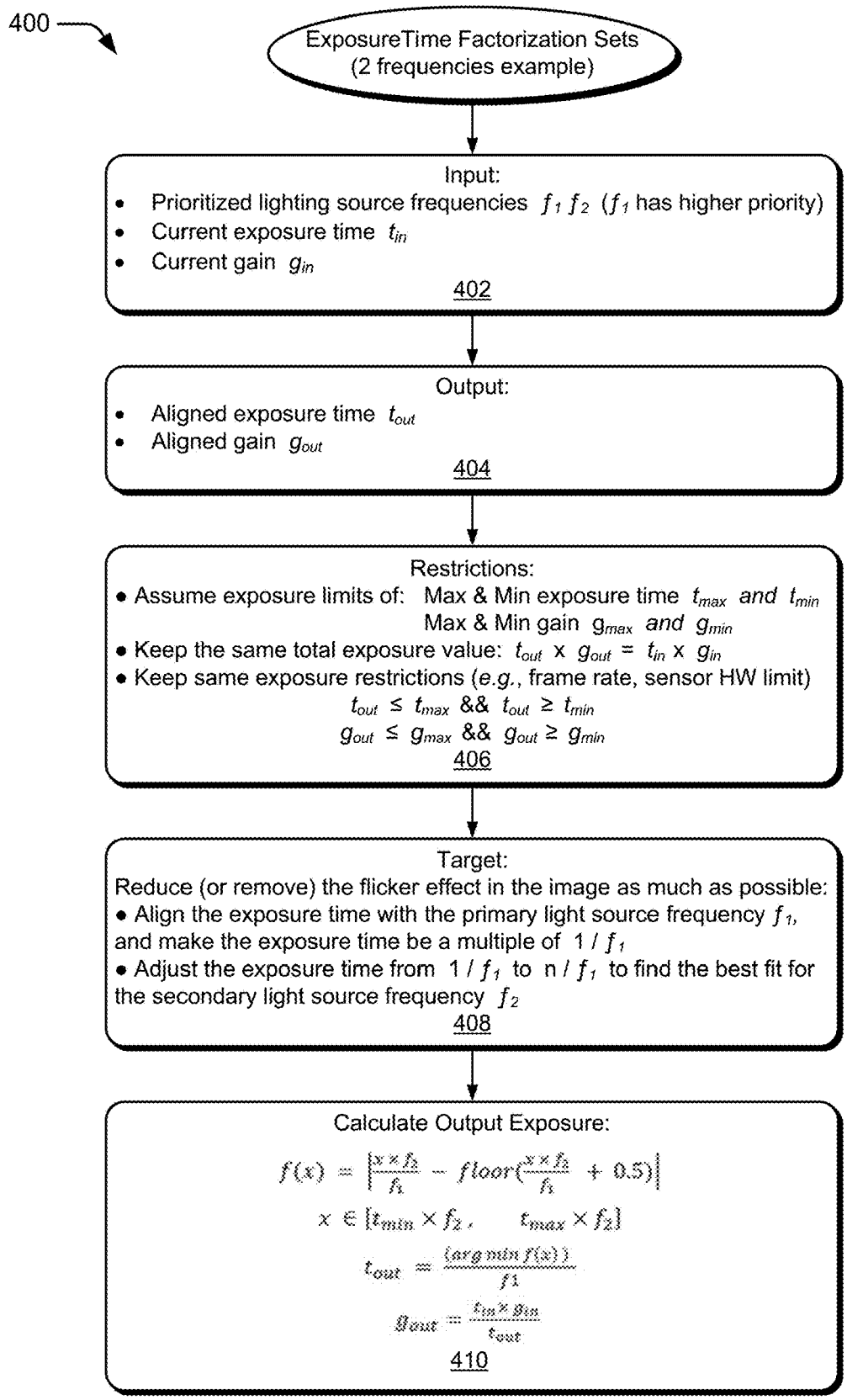
FIG. 4 is a flow chart illustrating operations and calculations of an example method of determining exposure-time factorization sets for adjusting an exposure time of an imaging device for reducing lighting flicker effect from multiple light sources in a captured image.

FIG. 4 is a flow chart illustrating operations and calculations of an example method 400 for determining exposure-time factorization sets for an imaging device. These exposure-time factorization sets are referenced to adjust an exposure time of the imaging device for reducing or canceling a flicker effect from a plurality of light sources in a captured image. This example depicts exposure-time factorization sets for two lighting frequencies (e.g., two light sources), but similar steps may be repeated for a third or additional light sources and respective lighting frequencies.

At 402, input parameters for determining exposure-time factorization sets are identified. These input parameters include prioritized lighting frequencies associated with a respective plurality of light sources and prioritized into at least a first-prioritized lighting frequency and a second-prioritized lighting frequency. The first-prioritized lighting frequency and the second-prioritized lighting frequency are designated, respectively, as frequencies $f_1$ and $f_2$, with $f_1$ having the higher priority. This means that $f_1$ was determined to have more of a flicker effect on the image from its light source as compared to $f_2$. Current exposure time and gain of the imaging device for capturing the image are represented respectively as input data $t_{in}$ and $g_{in}$.

At 404, output parameters to be calculated for the imaging device for exposure time and gain are defined respectively as $t_{out}$ and $g_{out}$. These represent what will be the final values of the aligned (e.g., adjusted) exposure time and gain, respectively, after the lighting frequencies are prioritized, exposure times are factorized, and an appropriately adjusted exposure-time value is selected as identified below.

At 406, restrictions associated with the imaging device are identified. These restrictions reflect information and data to be considered to ensure appropriate exposure-time factorization sets are calculated for effectively reducing a flicker effect in the image. As an example, assume the following definitions (B) and (C) for exposure limits:

Max & Min exposure time: $t_{max}$ and $t_{min}$ (B)

Max & Min gain: $g_{max}$ and $g_{min}$ (C)

Also, assume the same total exposure value is kept to ensure proper lighting of the image, expressed in the following function (D):

$t_{out} \times g_{out} = t_{in} \times g_{in}$ (D)

Additionally, general restrictions relating to exposure are also kept the same, for example, frame rate and sensor hardware (HW) limits, expressed as the following functions (E) and F):

$t_{out} \leq t_{max}$ && $t_{out} \geq t_{min}$ (E)

$g_{out} \leq g_{max}$ && $g_{out} \geq g_{min}$ (F)

Now, at 408, a target goal of this process is to reduce or remove the flicker effect in the captured image as much as possible. In this context, a first step is to align the exposure time with the primary light source frequency $f_1$. Then, the exposure time is made to be a multiple of $1/f_1$, thus providing an exposure-time factorization set for $f_1$. For example, if the exposure time is initially 50 milliseconds (ms), and the gain is 2×, then the total exposure is expressed in the following function (G):

50 ms*2=100 ms (G)

If, for example, the first light source frequency $f_1$ is 100 Hz, then the primary gap (e.g., the flicker frequency relative to the exposure) is 1000 ms÷100 Hz=10 ms/cycle (e.g., 10 milliseconds per cycle). As such, a first exposure-time factorization set for reducing or canceling a flicker effect in the captured image for the first-prioritized lighting frequency is defined as [10 ms, 20 ms, 30 ms, 40 ms . . . 100 ms].

The next step is to compensate for the second light source frequency $f_2$. If, for example, the second light source frequency $f_2$ is 70 Hz, then its primary gap is 1000 ms÷70 Hz=14.2 ms/cycle. Consequently, a second exposure-time factorization set for reducing or canceling flicker effect in the captured image for the second-prioritized lighting frequency is defined as [14.2 ms, 28.4 ms, 42.6 ms, 56.8 ms . . . 99.4 ms].

The next step is to adjust the exposure time from $1/f_1$ to $n/f_1$ to find the best fit for the secondary light source frequency $f_2$ within the $f_1$ exposure-time factorization set. If an exposure time in the second exposure-time factorization set matches an exposure time in the first exposure-time factorization set, then that matching exposure time is selected. If there is no exact match exposure time between the two sets, then the exposure time of the imaging device is adjusted to an exposure time in the first exposure-time factorization set that aligns near-to-matching an exposure time in the second exposure-time factorization set. Specifically, we search the factorization set of $f_2$ to find a frequency gap that matches or is a near-to-match of a frequency gap in the factorization set of $f_1$. In this example, 28.4 and 99.4 in the $f_2$ second exposure-time factorization set are both near-to-matches, respectively, with 30 and 100 in the $f_1$ first exposure-time factorization set. However, the exposure time of 100 ms in the first exposure-time factorization set of the first lighting frequency $f_1$ more closely matches 99.4 in the second exposure-time factorization set of the second lighting frequency $f_2$. Thus, selecting an exposure time of 100 ms for the imaging device will more effectively reduce or cancel the lighting flicker effect of both light sources in the resulting image.

At 410, the full function statements for determining these exposure-time factorization sets, and for adjusting the output exposure of the imaging device to reduce a flicker effect on the captured image, are expressed in the following functions (H), (I), (J), and (K):

$$f(x) = \left| \frac{x \times f_2}{f_1} - \text{floor}\left(\frac{x \times f_2}{f_1} + 0.5\right) \right|$$ (H)

$$x \in [\, t_{min} \times f_2, \ t_{max} \times f_2 \,]$$ (I)

$$t_{out} = \frac{(\arg\min f(x))}{f1}$$ (J)

$$g_{out} = \frac{t_{in} \times g_{in}}{t_{out}}$$ (K)

The operations and methods described herein, for example, with respect to methods 200, 300, and 400, may be embodied in programming instructions executable by a processor or processors in a computing device or system, either alone or in combination with hardware blocks in a computing device or system. Such programming instructions may be stored on a machine-readable medium (e.g., computer/processor-readable medium), including a non-transitory, random access memory (RAM), or a cache memory, for execution on a processor or processors of a computing device or devices. Alternatively or in combination with the non-transitory machine-readable medium, the programming instructions may be stored on other machine-readable media, for example, a read-only memory (ROM), flash memory, a solid-state drive (SSD), a hard disk drive (HDD), a compact disk (CD), a jump drive, or combination thereof.

The example methods described in this disclosure may include more than one implementation, and different implementations of the methods may not employ every operation presented in the respective flow diagrams or may employ additional operations not shown. Additionally, while the operations of the methods are presented in a particular order within the flow diagram(s), the order of their presentations is not intended to be a limitation as to the order in which the operations may actually be implemented or as to whether any, some, or all of the operations may be implemented. For example, one implementation of the method might be achieved through the performance of a number of initial operations without performing subsequent operations, while another implementation of the method might be achieved through the performance of more or all of the operations.

While this disclosure has been described with respect to example embodiments outlined above, it is evident that alternatives, modifications, and variations will be apparent to those skilled in the art. Accordingly, the described and depicted embodiments of the present disclosure are intended to be illustrative, not limiting, and the subject of the appended claims is not necessarily limited to the specific features or methods described in this disclosure.

What is claimed is:

1. A method of reducing a flicker effect of a plurality of light sources in an image captured with an imaging device, the method comprising:
   detecting a lighting frequency associated with each of at least two of the plurality of light sources;
   prioritizing the lighting frequency of each of the at least two of the plurality of light sources relative to the flicker effect upon the image, the prioritizing to identify at least a first-prioritized lighting frequency and a second-prioritized lighting frequency;
   determining a first exposure-time factorization set for the first-prioritized lighting frequency and a second exposure-time factorization set for the second-prioritized lighting frequency, the determining of the first and second exposure-time factorization set for the first- and second-prioritized lighting frequency, respectively, comprising:
      identifying a first exposure time effective to reduce the flicker effect of the first-prioritized lighting frequency in the image;
      identifying a first set of exposure times that includes multiples of a function calculated relative to the first exposure time;
      identifying a second exposure time effective to reduce the flicker effect of the second-prioritized lighting frequency in the image; and
      identifying a second set of exposure times that includes multiples of a function calculated relative to the second exposure time; and
   adjusting an exposure time of the imaging device to a second exposure time in the first exposure-time factorization set that aligns to at least one of a matching or near-to-matching exposure time in the second exposure-time factorization set.

2. The method of claim 1, wherein detecting a lighting frequency comprises at least one of counting an occurrence of a brightness change pattern in a known exposure time, using a dedicated light frequency sensor, leveraging fast Fourier processing, using a temporal filter, or a combination thereof.

3. The method of claim 1, wherein prioritizing the lighting frequency comprises referencing metric functions of at least one of a strength of the lighting frequency, a power-cycle function of the lighting frequency, a rolling-shutter effect of the imaging device, a frame rate of capture of the imaging device, or a combination thereof.

4. The method of claim 1, wherein the first-prioritized lighting frequency is identified as being a greater cause of an increased flicker effect of the image relative to the second-prioritized lighting frequency.

5. The method of claim 1, wherein the imaging device comprises at least one of a digital camera, a digital video camera, or a combination thereof.

6. The method of claim 1, the method further comprising:
   determining the first exposure-time factorization set within exposure limits of the imaging device, wherein the exposure limits are determined by at least one of:
      keeping a same total exposure value calculated relative to an exposure time and a gain value for the first-prioritized lighting frequency; or
      keeping identified restrictions of the exposure limits relative to a frame rate limit and a sensor hardware limit of the imaging device.

7. The method of claim 1, the method further comprising:
   prioritizing the lighting frequency of each of the at least two of the plurality of light sources to identify at least a third-prioritized lighting frequency;
   determining a third exposure-time factorization set for the third-prioritized lighting frequency; and
   adjusting the exposure time of the imaging device to a third exposure time in the first exposure-time factorization set that aligns to at least one of a second matching or near-to-matching exposure time in the second exposure-time factorization set and to at least one of a matching or near-to-matching third exposure time in the exposure-time factorization set.

8. An imaging device configured to reduce a flicker effect from a plurality of light sources in an image captured by the imaging device, the imaging device comprising a processor and instructions that when executed by the processor cause the processor to:
   detect a lighting frequency associated with each of at least two of the plurality of light sources;
   prioritize the lighting frequency of each of the at least two of the plurality of light sources relative to the flicker effect on the image, the prioritization to identify at least a first-prioritized lighting frequency and a second-prioritized lighting frequency;
   determine a first exposure-time factorization set for the first-prioritized lighting frequency and a second exposure-time factorization set the second-prioritized lighting frequency, a determination of the first and second exposure-time factorization set for the first- and second-prioritized lighting frequency, respectively, comprising:

identify a first exposure time effective to reduce the flicker effect of the first-prioritized lighting frequency in the image;

identify a first set of exposure times that includes multiples of a function calculated relative to the first exposure time;

identify a second exposure time effective to reduce the flicker effect of the second-prioritized lighting frequency in the image; and identify a second set of exposure times that includes multiples of a function calculated relative to the second exposure time; and adjust an exposure time of the imaging device to a second exposure time in the first exposure-time factorization set that aligns to at least one of a matching or near-to-matching exposure time in the second exposure-time factorization set.

9. The imaging device of claim 8, the image device further comprising instructions that when executed by the processor cause the processor to detect a lighting frequency by at least one of: counting an occurrence of a brightness change pattern in a known exposure time; using a dedicated light frequency sensor; leveraging fast Fourier processing; or using a temporal filter.

10. The imaging device of claim 8, the imaging device further comprising instructions that when executed by the processor cause the processor to prioritize the lighting frequency relative to metric functions of at least one of: a strength of the lighting frequency; a power-cycle function of the lighting frequency; a rolling-shutter effect of the imaging device; or a frame rate of capture of the imaging device.

11. The imaging device of claim 8, wherein the first-prioritized lighting frequency is identified to cause an increased flicker effect upon the image relative to the second-prioritized lighting frequency.

12. The imaging device of claim 8, the imaging device further comprising instructions that, when executed by the processor, cause the processor to determine the first exposure-time factorization set within exposure limits of the imaging device, wherein the exposure limits are determined by at least one of:

keeping a same total exposure value calculated relative to an exposure time and a gain value for the first-prioritized lighting frequency; or keeping identified restrictions of exposure relative to a frame rate limit and a sensor hardware limit of the imaging device.

13. The imaging device of claim 8, the imaging device further comprising instructions that, when executed by the processor, cause the processor to:

prioritize the lighting frequency of each of the at least two of the plurality of light sources to identify at least a third-prioritized lighting frequency;

determine a third exposure-time factorization set for the third-prioritized lighting frequency; and adjust the exposure time of the imaging device to a third exposure time in the first exposure-time factorization set that aligns to at least one of a second matching or near-to-matching exposure time in the second exposure-time factorization set and to at least one of a matching or near-to-matching exposure time in the third exposure-time factorization set.

14. The imaging device of claim 8, wherein the imaging device comprises at least one of a digital camera, a digital video camera, or combination thereof.

15. A machine-readable, non-transitory storage medium storing instructions that when executed by at least one processor cause the at least one processor to:

detect a lighting frequency associated with each of at least two of a plurality of light sources;

prioritize the lighting frequency of each of the at least two of the plurality of light sources relative to a flicker effect upon an image captured by an imaging device, the prioritization to identify at least a first-prioritized lighting frequency and a second-prioritized lighting frequency;

determine a first exposure-time factorization set for the first-prioritized lighting frequency and a second exposure-time factorization set the second-prioritized lighting frequency, a determination of the first and second exposure-time factorization set for the first- and second-prioritized lighting frequency, respectively, comprising:

identify a first exposure time effective to reduce the flicker effect of the first-prioritized lighting frequency in the image;

identify a first set of exposure times that includes multiples of a function calculated relative to the first exposure time;

identify a second exposure time effective to reduce the flicker effect of the second-prioritized lighting frequency in the image; and identify a second set of exposure times that includes multiples of a function calculated relative to the second exposure time; and adjust an exposure time of the imaging device to a second exposure time in the first exposure-time factorization set that aligns to at least one of a matching or near-to-matching exposure time in the second exposure-time factorization set.

16. The machine-readable, non-transitory storage medium of claim 15, the machine-readable, non-transitory storage medium further comprising instructions that when executed by the at least one processor cause the at least one processor to detect a lighting frequency by at least one of: counting an occurrence of a brightness change pattern in a known exposure time; using a dedicated light frequency sensor; leveraging fast Fourier processing; or using a temporal filter.

17. The machine-readable, non-transitory storage medium of claim 15, the machine-readable, non-transitory storage medium further comprising instructions that when executed by the at least one processor cause the at least one processor to prioritize the lighting frequency relative to metric functions of at least one of: a strength of the lighting frequency; a power-cycle function of the lighting frequency; a rolling-shutter effect of the imaging device; or a frame rate of capture of the imaging device.

18. The machine-readable, non-transitory storage medium of claim 15, wherein the first-prioritized lighting frequency is identified to cause an increased flicker effect upon the image relative to the second-prioritized lighting frequency.

19. The machine-readable, non-transitory storage medium of claim 15, the machine-readable, non-transitory storage medium further comprising instructions that when executed by the at least one processor cause the at least one processor to determine the first exposure-time factorization set within exposure limits of the imaging device, wherein the exposure limits are determined by at least one of: keeping a same total exposure value calculated relative to an exposure time and a gain value for the first-prioritized lighting frequency or keeping identified restrictions of exposure relative to a frame rate limit and a sensor hardware limit of the imaging device.

20. The machine-readable, non-transitory storage medium of claim 15, wherein the imaging device comprises at least one of a digital camera, a digital video camera, or combination thereof.

* * * * *